United States Patent [19]
Cupler, II et al.

[11] 3,780,406
[45] Dec. 25, 1973

[54] MACHINING CENTER EMPLOYING CAM OPERATED TOOL CHANGER

[75] Inventors: John A. Cupler, II, 10 Cupler Dr., Cumberland; Wayne B. Stone, Jr., Bethesda, both of Md.

[73] Assignee: said Cupler, by said Stone

[22] Filed: Jan. 26, 1971

[21] Appl. No.: 109,852

[52] U.S. Cl. ................ 29/26 A, 29/568, 408/35
[51] Int. Cl. ............................. B23q 3/157
[58] Field of Search ............ 29/26 A, 568, 44; 408/35

[56] References Cited
UNITED STATES PATENTS

| | | |
|---|---|---|
| 3,478,419 | 11/1969 | Cupler .......................... 29/568 |
| 3,263,300 | 8/1966 | Schatzman et al. ............ 29/26 A |
| 3,533,306 | 10/1970 | Link ............................. 29/44 X |
| 3,133,349 | 5/1964 | Riedel .......................... 29/568 |

FOREIGN PATENTS OR APPLICATIONS

| | | | |
|---|---|---|---|
| 14,944 | 9/1897 | Germany | 408/35 |

*Primary Examiner*—Andrew R. Juhasz
*Assistant Examiner*—Z. R. Bilinsky
*Attorney*—Colton & Stone

[57] ABSTRACT

A machining center wherein rotating tools are cammingly interchanged between a tool carrier and tool bearing as a direct function of tool carrier movement.

17 Claims, 7 Drawing Figures

PATENTED DEC 25 1973 3,780,406

INVENTORS.
JOHN A. CUPLER, II
WAYNE B. STONE, JR.

BY *Colton + Stone*

ATTORNEYS.

INVENTORS.
JOHN A. CUPLER, II
WAYNE B. STONE, JR.

BY *Colton & Stone*

ATTORNEYS.

INVENTORS.
JOHN A. CUPLER, II
WAYNE B. STONE, JR.

BY *Colton & Stone*

ATTORNEYS.

MACHINING CENTER EMPLOYING CAM OPERATED TOOL CHANGER

The disclosure relates, primarily, to machining centers of the type employing automatic or semi-automatic tool changers and is herein described in connection with machining centers employing open bearings and non-captive tools. A non-captive tool is herein defined as one which may undergo bodily movement, transversely of its own axis, relative to both the tool bearing structure which supports the tool in working position and a tool carrier which supports the tool in a non-working position.

BACKGROUND OF THE INVENTION

The public introduction of the machining center disclosed in U.S. Pat. No. 3,478,419 in 1969 marked the advent of a new concept in tool changing operations; that of the non-captive tool. The elimination of that "down time" inherently associated with tool changing cycles as practiced with chucked tools made it possible to routinely effect tool interchange cycles within time periods of 0.5 – 3 seconds depending upon the size tools involved. This was made possible by the direct interchange of tools between the bearing and tool carrier without the intermediary of a separate tool change element to remove a tool from the carrier and place it in a bearing and, also, without the necessity of performing chucking and unchucking operations or discontinuance of the tool drive. A complete background discussion of the basic differences and advantages inherent in non-captive tool changers vis-a-vis conventional chuck type tool changers appears in the aforesaid U.S. Pat. No. 3,478,419 whose disclosure is herein incorporated by reference. As will be appreciated from an inspection of the aforesaid patent disclosure; the machining center therein described is quite sophisticated and, consequently, relatively expensive. Although such prior non-captive tool changers have not required a disruption of the tool drive during a tool change cycle it has been necessary to disconnect the tool drive from the tool to permit the tool carrier to undergo a variable, compound path of movement relative to the bearing in order to effect tool interchange which requires a somewhat complex tool input drive mechanism as well as various synchronizing controls and drive mechanisms to produce the necessary compound movement of the tool carrier.

SUMMARY OF THE INVENTION

The primary purpose of the invention is to provide a machining center employing an extremely simple tool change mechanism which, basically, involves a single moving part; the tool carrier. Tools may thus be interchanged with a tool bearing as a direct function of tool carrier movement while the interchanged tools are rotating at full R.P.M. The tool changer is equally susceptible of manual, semi-automatic or fully automatic operation and is effected by movement of the various tool stations on the tool carrier along a common, uniform path. The path of movement undergone by tools supported at the tool stations is intersected by fixed cam surfaces merging with the open portion of the bearing so that movement of the tool carrier is effective to cam tools into and out of the open bearing; the non-working tools acting as idlers for an extensible recirculating drive belt which accommodates the slight relative movement of the interchanged tools relative to the tool carrier.

The word "tool," as used herein, refers not only to the working portion of th tool itself but also to its supporting spindle as is common terminology in connection with non-captive tools. It will be apparent that the working end portion of the tool could be formed separately and mounted on the spindle or formed integrally therewith.

Each of the tool carrier stations comprise a slot extending into the carrier whose depth exceeds the relative movement of a tool undergoing a camming interchange with the bearing so that all of the tools are continually positioned for engagement by the tool carrier for movement therewith in the direction of carrier movement. The closed ends of the slots include releasable tool supports for retaining the tools at such position prior to and following their working positionment on the open bearing at which time the working tool is held outwardly from the releasable tool support position but still within the slot. Thus the tool stations are mounted for movement along a common, uniform path adjacent the bearing and the releasable tool supports provided at each station define tool support axes which are, similarly, movable along a common uniform path which is parallel to the uniform path of tool station movement. The tools which are positioned at each station are releasably supported with their axes coincident with the tool support axes defined by the releasable tool supports throughout a major portion of the uniform path of movement undergone by the releasable tool supports but are cammingly diverted therefrom over a minor portion of their conjoint paths of movement. Thus, the tool stations and releasable tool supports follow a common uniform path throughout the total range of movement of the tool carrier while the tools positioned at the tool station follow a common, non-uniform path of movement. The expression common, uniform path is used in its usual sense to indicate a lack of variation throughout the total path length along which each of a plurality of elements are movable. The non-uniform path of movement undergone by the tools results from their camming movement into and out of the tool bearing.

An extensible drive belt is in constant driving engagement with at least two tools adjacent the bearing to bias the same in the direction of the releasable tool support position.

DESCRIPTION OF THE PREFERRED EMBODIMENTS

Figure 1:
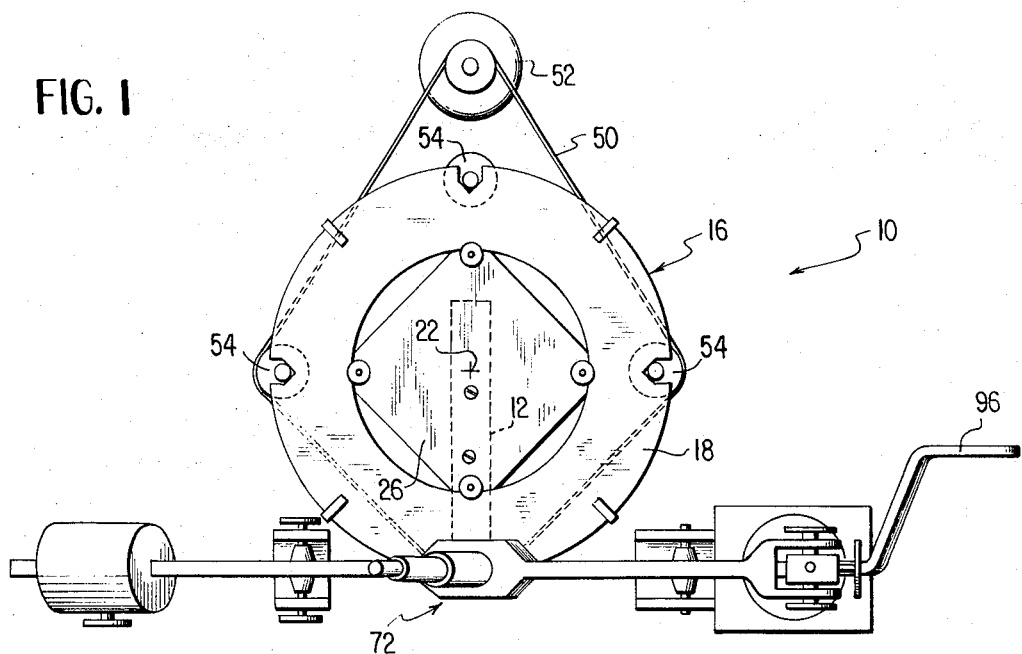
FIG. 1 is a top plan view of a machining center constructed in accordance with the present invention.
Figure 2:
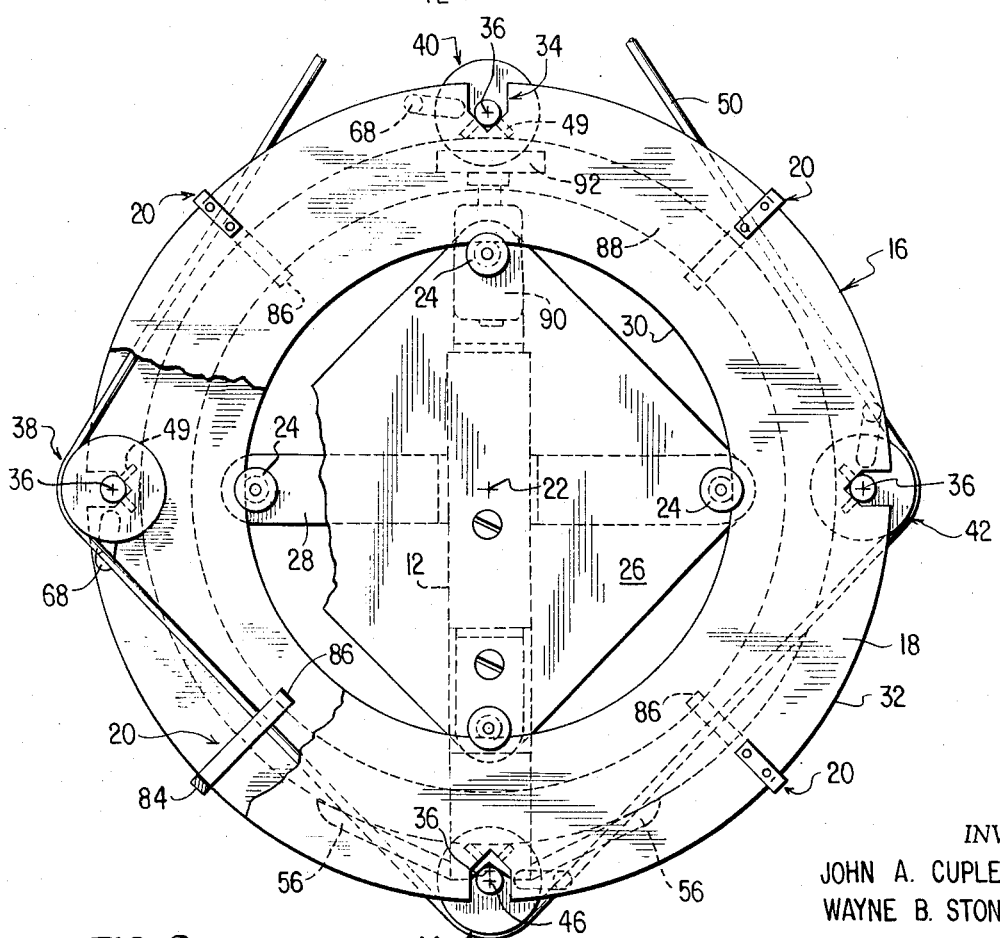
FIG. 2 is a broken, enlarged top plan view similar to FIG. 1 but omitting the infeed mechanism for clarity of illustration.
Figure 3:
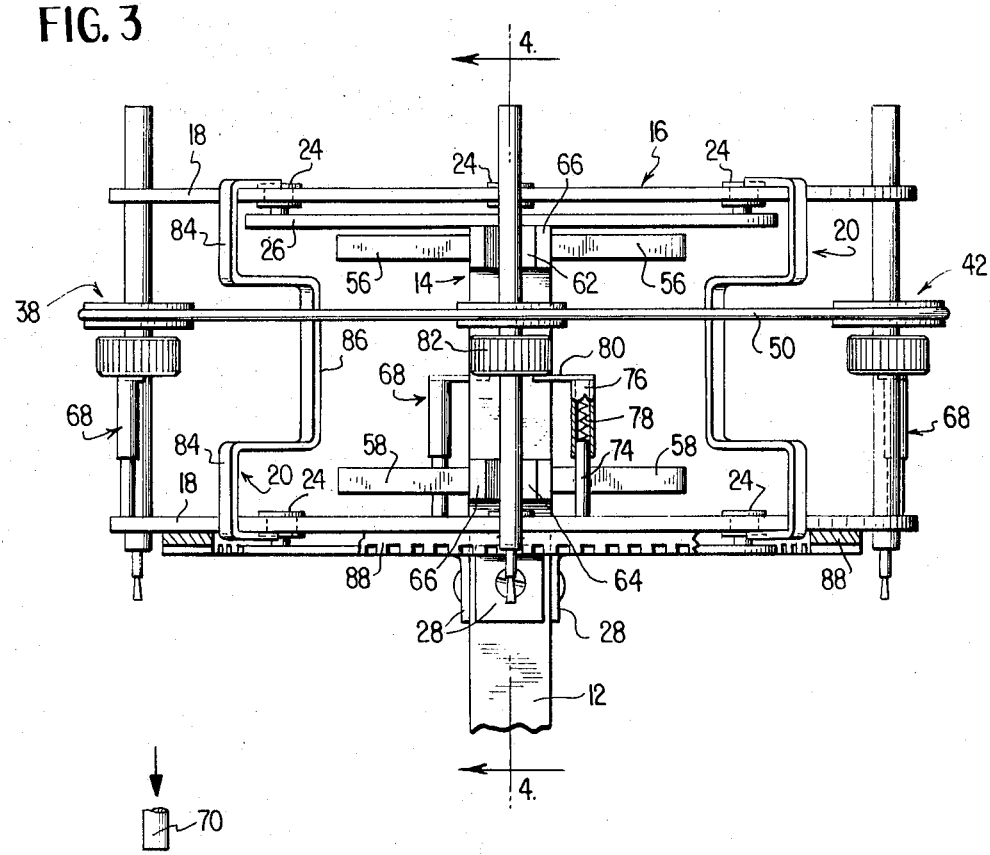
FIG. 3 is a front elevational view of the open bearing and associated tool change mechanism.
Figure 4:
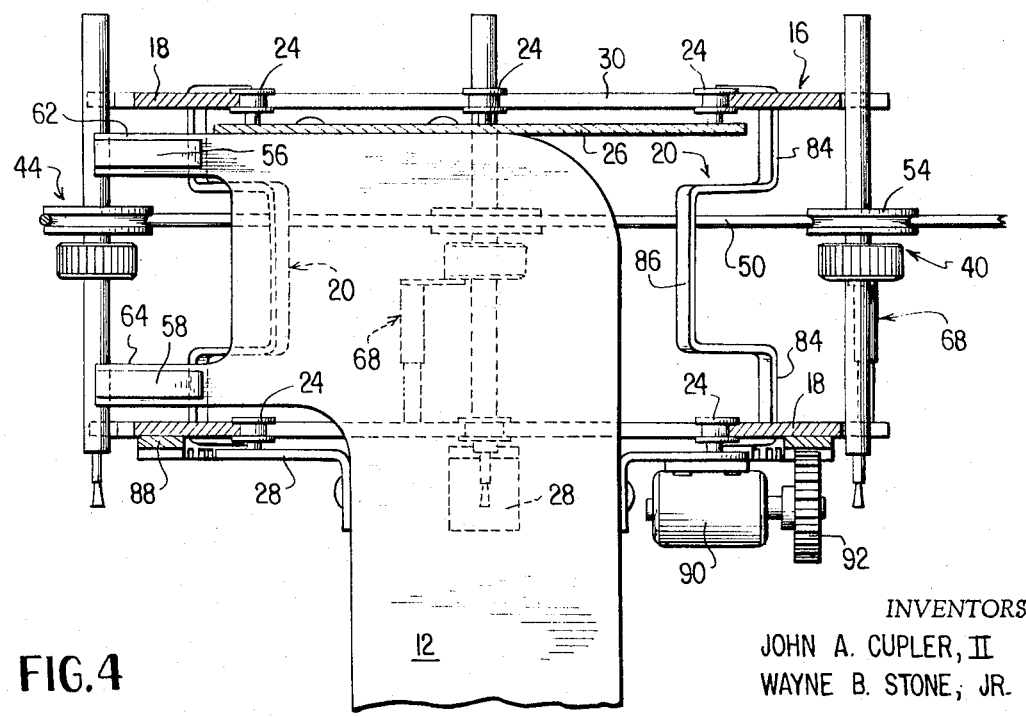
FIG. 4 is a partly sectioned view taken along line 4—4 of FIG. 3.
Figure 5:
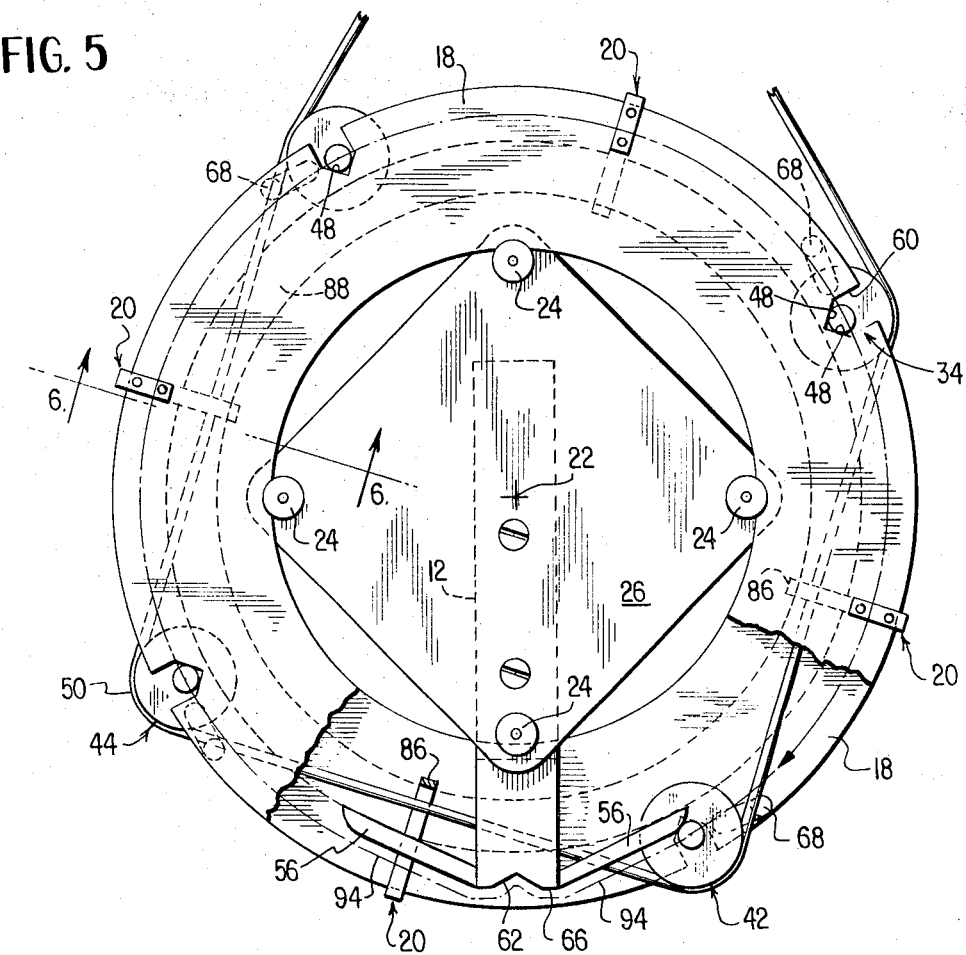
FIG. 5 is a view similar to FIG. 2 but illustrating a different tool carrier position.
Figure 6:
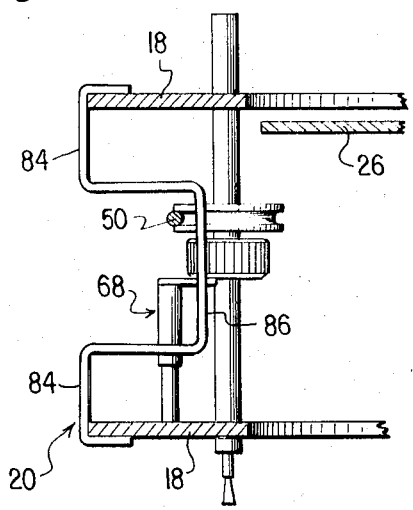
FIG. 6 is a cross-sectional view taken along line 6—6 of FIG. 5.

The machining center 10 is best illustrated, in its entirety, in FIGS. 1, 3 and 4. A fixed standard 12 having integrally mounted thereon an open bearing 14, herein illustrated as a Vee bearing, is rigidly mounted on any desired support such as a work table, not shown. A tool carrier 16 comprising a pair of annular plates 18 rigidly interconnected by interplate connectors 20 is mounted for rotation about an axis 22 by a plurality of flanged idler rollers 24 mounted on upper and lower bracket plates 26, 28 secured to standard 12 and engaging the inner peripheries 30 of upper and lower plates 18. The outer periphery 32 of tool carrier 16 is slotted to form a plurality of tool stations 34. The radially innermost end of each tool station 34 includes releasable tool support means defining a tool support axis 36 which, in the case of the non-working tools 38, 40, 42 positioned as shown in FIG. 2, will be coincident with the tool axis. In the case of the working tool 44 positioned as shown in FIG. 2, the tool is in bearing engagement with Vee bearing 14 whose bearing surfaces define a working tool axis 46 which is radially outwardly spaced from the releasable tool support axis 36. The releasable tool support axis 36 is defined at each station by Vee bearing surfaces 48 formed at the radially inner end of each tool station and, in the embodiment of FIG. 1–6, cooperating permanent magnets 49, flush with each bearing surface 48, are provided to maintain a tool in coincident axial alignment with axis 36 until the same is cammed radially outward therefrom by camming means associated with the Vee bearing. Each tool station 34 is defined by a pair of slots; i.e., aligned upper and lower slots in the rigidly interconnected upper and lower plates 18 as clearly shown in FIG. 4.

An extensible recirculating drive belt 50 of the type disclosed in U.S. Pat. No. 3,533,225 is drivingly engaged with the drive pulley of a motor 52 and at least three of thee tools on tool carrier 16 by virtue of the frictional driving engagement with tool spindles 54.

Oppositely directed upper and lower cam pairs 56, 58 positioned on either side of bearing 14 cooperate with the sides 60 of each of the slots forming the tool stations to directly cam tools into and out of Vee bearing 14 as a single function of tool carrier movement. The cam pairs 56, 58 are rigidly mounted to the upper and lower Vee sections 62, 64 comprising the composite Vee bearing 14 and one end of the outer cam surfaces thereof merge smoothly with wall portions 66 on either side of each Vee section which wall portions, in turn, merge smoothly with each of the Vee sections. The other ends of the cam surfaces intersect the rotary path of movement undergone by tools 38, 40, 42, 44 as the tool carrier is rotated about axis 22.

A plurality of tool positioning posts 68 rigidly secured to lower annular plate 18 ensure that the drive pulley 54 of each tool positioned on the tool carrier will lie in the same plane as does the recirculating drive belt 50 except during that period of time when the particular tool is in working position at which time the tools may undergo a reciprocating infeed motion as imparted thereto by the usual push rod 70 of a conventional manual infeed mechanism 72 of that type conventionally employed with Vee machining centers and more particularly described in those technical bulletins published by National Jet Company, Cumberland, Maryland under the catalog designation M2-269, M3-668 and M7-967. Each tool positioning post 68 is positioned adjacent a tool station 34 and comprises a lower stud 74 mounted on lower plate 18 and an upper telescoping sleeve 76 normally biased to a fully extended position by a spring 78 against an internal extension limiting stop, not shown. A tool positioning arm 80 integral with sleeve 76 is adapted to engage the undersurface of a knurled ring 82 integral with each tool. Aternatively, the ring 82 could be omitted and arm 80 positioned to engage the undersurface of tool drive pulley 54. In either event it will be apparent that positioning posts 68 act to resiliently bias each of the tools to the upper positions shown in the drawings.

The particular compound configuration of the interplate connectors is to permit passage of the same past Vee bearing 14 while yet insuring that the run of the recirculating drive belt 50 is unimpeded at all times. Thus the upper and lower bight portions 84 of each interplate connector are dimensioned to pass, with clearance, past the upper and lower Vee bearing sections 62, 64, respectively, while the central reversely directed bight portion 86 extends radially inward a sufficient distance to insure that the straight line run of dirve belt 50 between adjacent tools is always positioned radially outward thereof as will be apparent from an inspection of FIGS. 2 and 5.

As previously stated, the machining center is adapted for manual, semi-automatic or fully automatic operation and is herein specifically illustrated for semi-automatic and manual operation. A ring rack 88 is rigidly secured to the undersurface of the lower annular plate 18 and a stepper motor 90, rigidly mounted on standard 12, has a pinion 92 secured to the output shaft thereof positioned in meshing engagement with rack 88. Intermittent energization of motor 90 by either a manually controlled switching arrangement or a conventional tape program control results in the intermittent or stepped rotation of tool carrier 16 to cam one tool out of bearing 14 and can another tool into bearing engagement therewith.

Thus, in operation and assuming the completion of a work operation by a tool 44 positioned as in FIG. 2; energization of motor 90 results in the clockwise rotation of tool carrier 16 which, in the specific example herein illustrated, will be continuous through an arc of 90°. Upon initial rotation of carrier 16, the side wall 60 of the slotted tool station engages tool 44 and the same is cammed radially outward along the left incline (as viewed in FIG. 2) of Vee bearing 14 until it reaches surface 66. The tool is then moved along surface 66 by the continued rotation of carrier 16 and, then, down the inclined surfaces of the upper and lower left side cams 56, 68, as viewed in FIGS. 2 and 3. The path of movement described by the tool axis 46 of each tool as it is cammed into and out of Vee bearing 14 is illustrated by the broken line 94 in FIG. 5 and the just described movement of tool 44 out of bearing 14 followed that portion of broken line 94 to the left of Vee bearing 14 as viewed in FIG. 5. Inasmuch as the extensible drive belt 50 is constantly under tension, tool 44 is biased radially inward toward the inner end of its associated tool station and the tool support axis 36 defined thereby, at all times. Upon reaching the leftmost ends of cams 56, 58 tool 44 is urged full against the Vee bearing surfaces at the inner end of the tool station and into axial alignment with tool support axis 36 whereupon it is releasably retained by magnets 49 while the associated positioning post 68 insures that spindle 54 will not become misaligned with drive belt 50 when the tool moves out of engagement with the drive belt upon reaching the position of tool 40 in FIG. 2. Following the removal of tool 44 from bearing engagement with Vee bearing 14 and its repositionment at the inner end of tool station 34, as just described; further rotation of carrier 16 brings tool 42 into intiial engagement with the right hand upper and lower cams 56, 58. This is the position of FIG. 5. The tool is thus cammed outwardly with its axis following the dotted line 94 until the same bottoms in Vee bearing 14 at which time it is held outwardly of the Vee bearing surface 48 on the tool station by virture of its bearing engagement with bearing 14. The working tool may then be infed relative to bearing 14 in any desired manner conventional to the non-captive tool art. The infeed mechanism herein illustrated involves a manual manipulation of handle 96 to reciprocate push rod 70 however a fully automated cone cam infeed mechanism under programmed control may be used to reciprocate push rod 70 after the manner clearly disclosed in U.S. Pat. No. 3,478,419. Positioning posts 68 yield to the downward movement of push rod 70 and assist drive belt 50 in returning the working tool to the upper position upon withdrawal of the push rod from engagement with the tool spindle.

Figure 7:
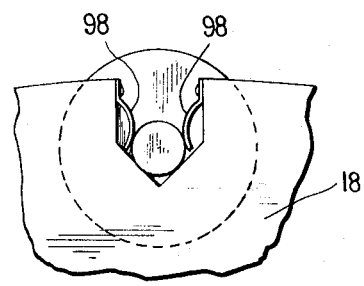
FIG. 7 is a fragmentary top plan view of a modified releasable tool support.

In FIG. 7 is illustrated an alternate method of releasably retaining the tools in the non-working tool support position which includes a pair of arcuately curved leaf springs 98 appropriately secured to the side walls of the tool station forming slot. The leaf springs 98 would, of course, be duplicated in the upper and lower aligned slots defining a single tool support station.

For a completely manual operation, tool carrier 16 may be rotated manually as by gripping the same and rotating it through 90° to change tools. During such manual manipulation the motor 90 would, of course, be deenergized with its rotor simply being rotated by virtue of the geared engagement between rack and pinion 88, 92. Alternatively, the motor and rack may be dispensed with for those installations not requiring semi-automatic or automatic operation. In either event it will be clear that precise positionment of the carrier is not critical since the large bias exerted by drive belt 50 on the working tool will force the same into axial coincidence with the axis of tool rotation defined by Vee bearing 14 provided only that the rotation of carrier 16 brings the next working tool in such juxtaposition to bearing 14 that it engages either of the Vee forming surfaces thereof. This is an important consideration where small and microtools are concerned since if the bearing itself were moved one could not be assured that each successive tool would be positioned on the same unique work axis with the inherent likelihood of tool breakage.

It will be apparent that the tools positioned to either side of the working tool act, in effect, as idlers for the recirculating drive belt. Consequently, each tool is rotating at full R.P.M. before and during its transfer to the bearing so that those "down times" previously associated with tool change operations due to the necessity of disrupting tool rotation are eliminated.

We claim:

1. A machining center, comprising; an open tool bearing defining an axis of tool rotation; a tool carrier including a plurality of tool stations each comprising a releasable tool support means defining a tool support axis at each said station substantially parallel to said axis of tool rotation; means mounting said tool carrier for movement of said tool stations along a common uniform path adjacent said open bearing; and means for interchanging tools with said bearing as an incident of and during said movement.

2. The machining center of claim 1 wherein the last named means include cam means.

3. The machining center of claim 2 wherein said cam means include at least one cam surface positioned for engagement with tools supported at said stations and merging with the open portion of said bearing.

4. The machining center of claim 3 wherein each said tool support axis is fixed relative to said tool carrier for movement therewith along a common uniform path adjacent said bearing; and said one cam surface intersects the common path of movement of the tool support axis whereby movement of said tool carrier effects a camming engagement between tools supported along said last named axes and said one cam surface for camming tools into bearing engagement with said open bearing.

5. The machining center of claim 4 wherein said cam means includes cam surfaces positioned on opposite sides of and merging with the open portion of said bearing; and said cam means intersecting the common path of movement of said tool support axes on opposite sides of said bearing.

6. The machining center of claim 5 wherein said open bearing is defined, at least in part, by cam surfaces integral therewith; and said tool stations include tool engaging portions, in addition to said releasable tool support means, for imparting the movement of said carrier to tools positioned at said tool support stations whereby movement of said tool carrier results in at least a component of said movement being imparted to tools supported at said tool support stations during the tool interchange operation.

7. The machining center of claim 6 including means independent of said releasable tool support means for maintaining a tool at each said station.

8. The machining center of claim 7 wherein said last named means includes, at least in part, recirculating drive means.

9. The machining center of claim 8 wherein said recirculating drive means comprises an elastic recirculating drive member for accommodating the movement of tools into and out of said open bearing.

10. The machining center of claim 9 wherein said open bearing is a Vee bearing and said cam surfaces defining at least a part of said open bearing comprising the sides of said Vee bearing.

11. A machining center, comprising; an open bearing defining an axis of tool rotation; a tool carrier including a plurality of tool receiving openings; releasable tool support means associated with said tool receiving openings for supporting a tool in a non-working position within the confines of each said tool receiving opening; means mounting said tool carrier for movement of said openings along a path adjacent said bearing; means for shifting a tool laterally of its own axis within the confines of each said opening between said non-working position and a working position on said bearing; means for urging the tools toward the non-working position; and means for infeeding a working tool parallel to its own axis.

12. The machining center of claim 11 wherein said open bearing is a Vee bearing; and said means for shifting a tool laterally of its own axis comprises cam means.

13. The machining center of claim 11 wherein said releasable tool support means include magnet means.

14. The machining center of claim 11 wherein said releasable tool support means include resilient means.

15. The machining center of claim 11 wherein said tool carrier is a rotary tool carrier and said tool receiving openings comprise slots extending inwardly from the periphery thereof; and said releasable tool support means mounted adjacent the inner ends of said slots.

16. The machining center of claim 11 including tools positioned in at least two of said openings; and said means for urging the tools toward the non-working position comprising a tensioned flexible drive member in driving engagement with said tools; and means for driving said flexible drive member.

17. A method of changing tools, comprising; supporting a plurality of tools in a tool carrier for arcuate movement adjacent a tool bearing about an axis spaced from and parallel to the axis of each of said plurality of tools; moving said carrier about said axis; camming one of said tools laterally of its own axis out of said bearing; and camming another of said tools laterally of its own axis into said bearing.

* * * * *